United States Patent [19]

Hayashi

[11] 4,385,752

[45] May 31, 1983

[54] POROUS PLUG FOR MOLTEN METAL VESSEL

[75] Inventor: Yoshihiro Hayashi, Ohtsu, Japan

[73] Assignee: Aikoh America Corp., Westlake, Ohio

[21] Appl. No.: 339,412

[22] Filed: Jan. 15, 1982

[51] Int. Cl.³ .............................................. C21B 7/16
[52] U.S. Cl. .................................... 266/265; 266/220; 266/270
[58] Field of Search ........................ 266/265, 270, 220

[56] References Cited

U.S. PATENT DOCUMENTS 3,971,548  7/1976  Folgero .............................. 266/265

Primary Examiner—P. D. Rosenberg
Attorney, Agent, or Firm—Maky, Renner, Otto & Boisselle

[57] ABSTRACT

A porous plug for treating molten metal is characterized by a porous refractory body having an axis and a wear detection refractory element in transaxial juxtaposition with the porous refractory body over a portion of the axial height of the body, the wear detection refractory element having an emissive power different from that of the porous refractory body to provide a discernible indication of the extent of wear of the porous refractory body. The wear detection refractory element may be in the form of a porous refractory insert internally located within the porous refractory body or a non-porous refractory sleeve surrounding the porous refractory body, or combinations thereof. The insert or sleeve may have top end faces located at the minimum melt down height of the porous plug whereby when the plug melts down sufficiently to expose the top end face of the insert or sleeve indicating that the plug is at the end of its useful life, the plug at high temperature after use will vary in brightness across its top surface thus permitting detection of such end of the plug life through observation of the brightness pattern resulting from the different emissive powers of the body and insert or sleeve.

21 Claims, 12 Drawing Figures

FIG.4a  FIG.4b
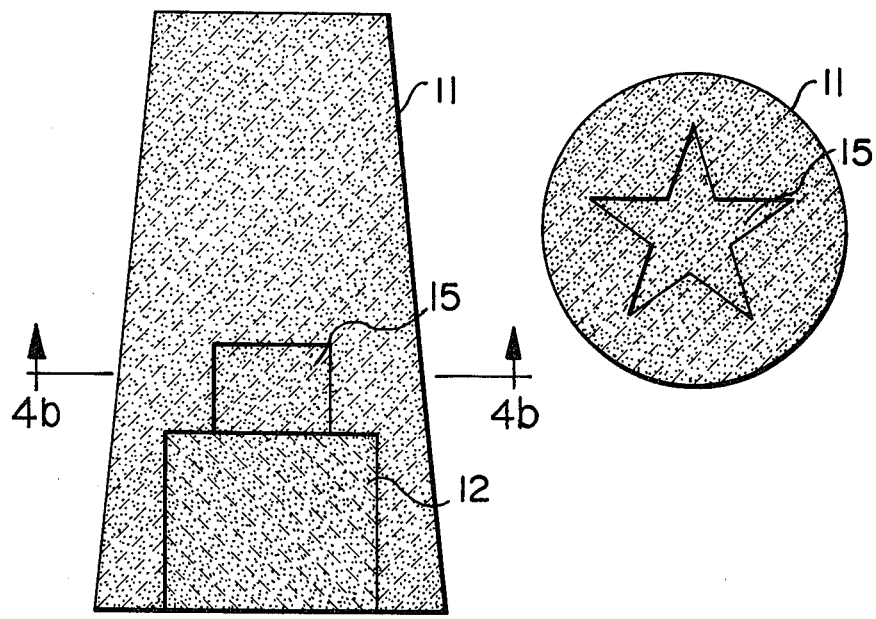
FIG.5  FIG.6
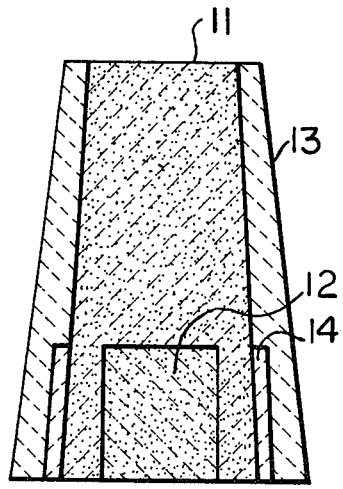
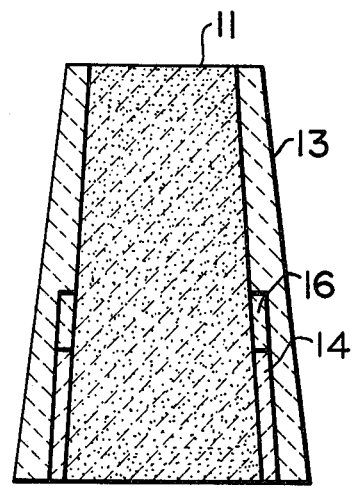

POROUS PLUG FOR MOLTEN METAL VESSEL

This invention relates generally to a porous refractory plug useful in the bubbling treatment of molten metals wherein, for example, a gas is introduced by such plug into the bottom of a vessel containing molten metal and caused to bubble to the surface of the molten metal. More particularly, the invention relates to a porous refractory plug whose remaining life can be easily and precisely ascertained, such remaining life varying independently in use as a result of erosion and melt-down of the plug which progresses as a function of the length and number of times gas is blown into the molten metal through the plug.

BACKGROUND OF THE INVENTION

Porous plugs are advantageously used in vessels for molten metal, such as ladles, ladle refining furnaces and tundishes, in order to render uniform the temperature of the molten metal and to accelerate desired refining reactions. Typically, the porous plug includes a porous refractory body which may have assembled thereon a steel or iron jacket which is connected to a gas inlet pipe. The porous plug is fitted in an opening in the bottom of the vessel and a gas such as nitrogen or argon is blown through the porous plug into the molten metal contained in the vessel. The gas bubbles up from the exposed top surface of the porous refractory body of the plug through the molten metal contained in the vessel to effect stirring and mixing of the molten metal and to obtain other advantageous results.

In use, the porous plugs are subject to erosion and melt-down at their top surfaces. Usually, melt-down of a porous plug progresses at a rate faster and more indeterminate than that of the refractory lining of the vessel for the molten metal. Therefore, to prevent leakage of the molten metal through the plug-mounting opening or port, which may be quite catastrophic, the remaining life of the plug must be ascertained after each use of the vessel and preferably without having to first cool the vessel in order to determine whether the plug has served its useful life and should be replaced. With molten metals such as steel, plug melt-down is particularly severe because the plug is subject to high pressure, turbulent contact with the molten steel, such as at 1870° K. or higher. Such severe melt-down, or actually breakage, results from the invasion or penetration of molten steel into the exposed surface layer of the plug, such being caused by the heavy pressure or weight of the molten steel acting on the plug when blowing of the gas through the plug has ceased. In addition, erosion of the plug is causd by slag acting thereagainst after the molten metal has been poured out of or otherwise removed from the vessel.

Heretofore, the remaining useful life of a porous plug has been ascertainable in the following ways:

(a) A bar may be inserted through the upper end of the vessel to measure the remaining height of the porous plug, such measurement being made relative to the bottom surface of the vessel.

(b) For porous plugs which vary in cross-section along their vertical axes, the diameter of the eroded top surface of the porous plug may be measured at a small distance therefrom by using an optical measuring instrument, thereby to estimate the remaining height of the plug.

(c) For porous plugs provided with discontinuously varying diameters, the remaining life of the plug may be ascertained by measuring the then exposed diameter.

All these methods of measuring the life of the porous plugs, however, are disadvantageous for one or more reasons. For instance, method (a) is dangerous when the measurements are taken while the vessel is at a high temperature. Moreover, measuring error may occur because of the unevenness of the base surface. Method (b) may be better but in addition to the difficult problem of maintenance of the precision optical measuring instrument under extreme environmental conditions of rapidly changing temperatures, measuring error occurs because of the visual distortion caused by convection of hot air. As a result, it is necessary to replace the porous plug prematurely to account for the measuring error and thus to assure that the plug is replaced before it wears out. Such premature replacement of the plug is uneconomical and alters or disrupts the use plan of the vessel. As for method (c), the observer must look for the discontinuous change of diameter in the direction of the larger diameter in view of the relation of the plug diameter to gas-flow resistance. Since the experimentally determined, safe, remaining height of a plug is 100 mm. or one half of the diameter of the bottom surface of the plug, method (c) disadvantageously requires excess, expensive porous refractory material to be used.

SUMMARY OF THE INVENTION

A principal object of the present invention is to provide a porous plug whose life can be easily and precisely ascertained without the aforementioned drawbacks associated with prior porous plugs and methods of measurement.

To the achievement of this and other objects of the invention, the invention provides a porous plug for treating molten steel comprising a porous refractory body having an axis and a wear detection refractory element in transaxial juxtaposition with the body and having an emissive power different from that of the body for providing a discernible indication of the extent of wear of the plug. More particularly, the wear detection refractory element may be a porous refractory insert embedded within the lower end of the porous refractory body and having a top end face located at the minimum melt-down height of the body. Accordingly, when the plug melts down sufficiently to expose the top end face of the insert, such occurring at the end of the useful safe life of the plug, the plug at high temperature after use will vary in brightness across its top surface thus permitting detection of the end of the plug life through observation of the brightness pattern resulting from the different emissive powers of the body and insert.

In alternative arrangements, the wear detection refractory element may be a sleeve which surrounds the porous refractory body. Moreover, several inserts and/or sleeves of different emissive powers, or combinations thereof, may be provided with end faces at different heights of the porous plug to permit visual detection of the progress of plug melt-down and erosion.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 4a is a vertical axial section through still another embodiment of porous plug according to the invention;

FIG. 4b is a transaxial cross section through the porous plug of FIG. 4a taken substantially along the line 4b—4b thereof; and FIGS. 5-9 are vertical axial sections through still other embodiments of porous plug according to the invention.

DETAILED DESCRIPTION

Figure 1:
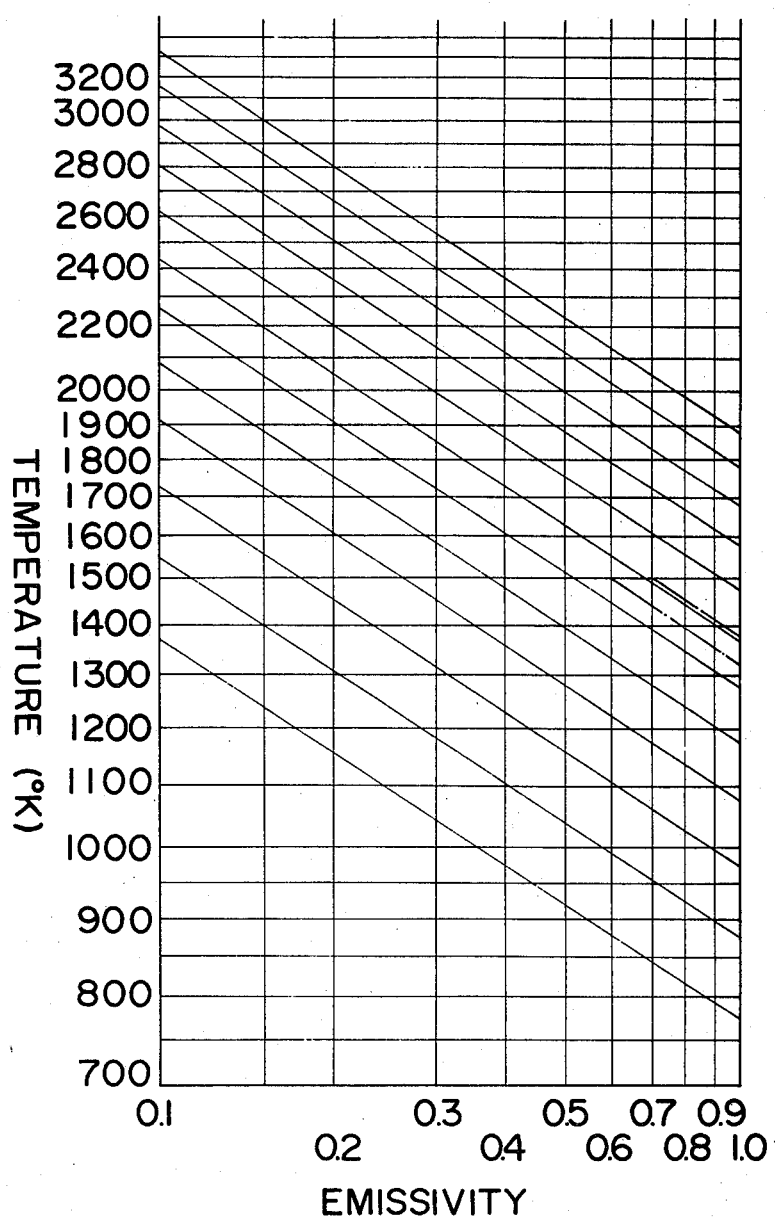
FIG. 1 is a chart showing the relation between true absolute temperature and the brightness temperature measured by a light pyrometer of a refractory object in which the emissive power is the taken parameter.

The relationship between the temperature and brightness of an object at a temperature at which visible light is radiated, can be quantitatively determined from the relationship between true temperature and the brightness temperature read by a light pyrometer, in which emissive power is the taken parameter. In FIG. 1, such relationship is shown by a chart with regard to all radiations, If, for example, two objects are at a temperature of 1500° K. and have emissive powers of 0.6 and 0.7, respectively, the brightness temperature of the former becomes 1330° K. while that of the latter becomes 1380° K. as indicated by the phantom lines in FIG. 1. Since there is a difference of 50° K. between the two brightness temperatures, it is possible to clearly distinguish the brightness temperatures from each other. That is, the measuring precision of say a light pyrometer permits measurement of temperature by comparing the brightness temperatures of two objects (filament and the body for which temperature is to be measured) within a difference of about 5° K. without substantial skill. Therefore, it is easy to distinguish the brightness temperatures of two objects when there is a difference of 50° K. In addition, it is also possible to obtain a difference of 0.1 or more in the emissive power of refractories.

Figures 2A, 2B:
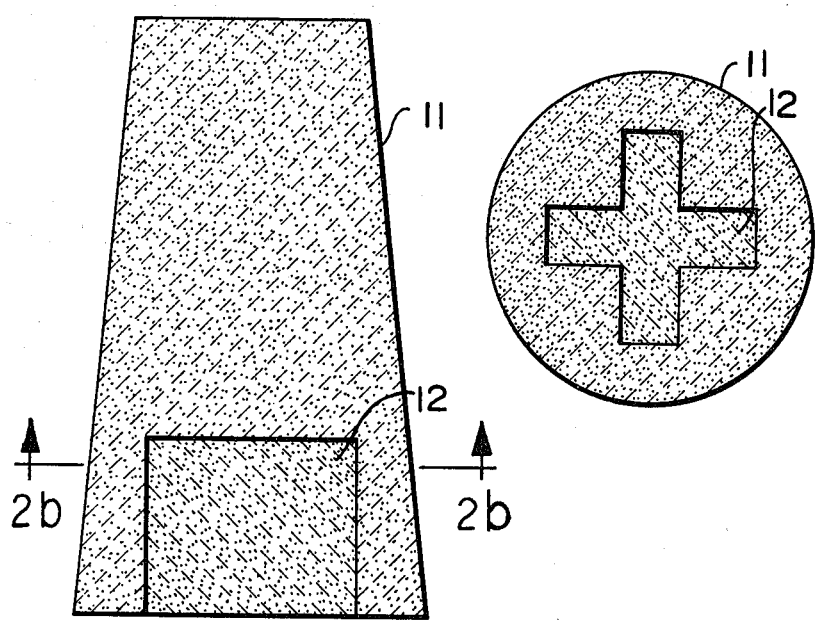
FIG. 2a is a vertical axial section through a porous plug according to the invention.
FIG. 2b is a transaxial cross section through the porous plug of FIG. 2a taken substantially along the line 2b—2b thereof.
Figures 3A, 3B:
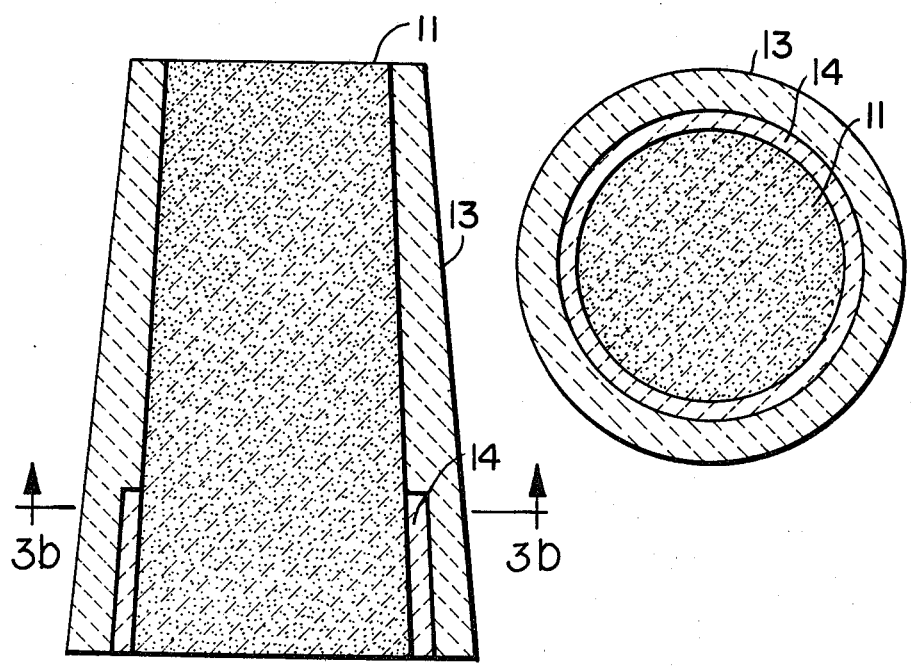
FIG. 3a is a vertical axial section through another embodiment of porous plug according to the invention.
FIG. 3b is a transaxial cross section through the porous plug of FIG. 3a taken substantially along the line 3b—3b thereof.

Some specific embodiments of a porous plug according to the invention are shown in FIGS. 2-9 wherein like reference numerals are used to designate generally corresponding elements of the various figures. FIGS. 2 and 4 show porous plugs including a porous refractory body and a wear detection refractory element in the form of a porous refractory insert or internal portion of the porous refractory body. The porous refractory insert is embodied within the porous refractory body and preferably has a discernible and discriminating transaxial cross-sectional shape or configuration. The porous refractory insert also has an emissive power different from the emissive power of the porous refractory body. FIGS. 3 and 6 show porous plugs wherein the wear detection element is in the form of a non-porous refractory sleeve for the porous refractory body. The sleeve has an emissive power different from the emissive power of the porous refractory body and surrounds the lower portion of the porous refractory body. FIGS. 5-9 show still other embodiments of porous plug according to the invention in which inserts and sleeeves are both utilized.

Referring now in detail to FIG. 2, a porous plug according to the invention includes a porous refractory body 11 and a wear detection refractory element in the form of a porous refractory insert 12 which has an emissive power different from the emissive power of the porous refractory body 11. The porous refractory body has a truncated conical shape whereas the porous refractory insert has an easily discernible and discriminating transaxial cross-sectional shape in the form of a cross as seen in FIG. 2b. The porous refractory insert also has a top surface located at the minimum meltdown height of the body. In particular, the height of the top surface of the porous refractory insert may be the greater value of either 100 mm. or one half the diameter of the bottom surface of the porous refractory body.

Although not illustrated, the porous plug of FIG. 2 desirably will have a steel jacket or shell surrounding the side and bottom surfaces thereof. The jacket may have a central opening therein whereat a gas intake tube is attached, such tube providing for entry of gas into the bottom of the porous body. The steel jacket may cover the entire bottom surface of the porous body as well as the lower one-third of the side surface.

Referring now to FIG. 3, another embodiment of porous plug includes an outer non-porous refractory sleeve or casing 13 for the porous refractory body 11, such outer casing being between the body 11 and the steel jacket (not shown) and extending the axial height of the body 11. In this embodiment, the wear detection refractory element is in the form of a non-porous refractory sleeve 14 which may surround the lower end of the porous refractory body, and as shown, may be surrounded by refractory casing 13. The refractory sleeve 14 actually replaces the lower radially inner portion of the refractory casing 13. The refractory sleeve 14 has an emissive power different in the emissive powers of the porous refractory body and the refractory casing 13 and has a top face located at the minimum melt down height of the body. More particularly, the top face of the sleeve 14 may be at a height which is the greater of either 100 mm. or one half the diameter of the bottom surface of the porous refractory body.

Reference now being had to FIG. 4, the embodiment of porous plug illustrated therein is similar to that shown in FIG. 2 but further includes a second or upper porous refractory insert 15 having an emissive power different from that of the porous refractory body 11 and also the first or lower porous refractory insert 12. The upper porous refractory insert 15 is axially juxtaposed on top of the lower refractory insert 12 and preferably has a different cross-sectional shape than that of the lower refractory insert. As seen in FIG. 4b, the upper refractory insert 15 has a star shape which is readily distinguishable from the cross shape of the lower refractory insert 12. It will be appreciated that the upper porous refractory insert 12 permits detection of the approaching end life of the porous plug. As a result, the progressive state of wear of the porous plug can be detected at a point other than when the plug is at its minimum melt-down height, i.e., at the end of its useful life.

Referring now to FIGS. 5–9, still other embodiments of porous plugs according to the invention are shown, such embodying combinations of the features illustrated in FIGS. 2–4. FIG. 5 shows an embodiment where the wear detection refractory elements of FIGS. 2 and 3 are combined in a single porous plug. FIG. 6 shows another embodiment which includes a second or upper non-porous refractory sleeve 16 axially juxtaposed on top of the first or lower refractory sleeve 14. The refractory sleeves 14 and 16 have an emissive power different from that of the other, the porous refractory body 11 and the non-porous refractory casing 13. With such porous plug, the progressive wear thereof can be detected as with the porous plug shown in FIG. 4.

Figure 7:
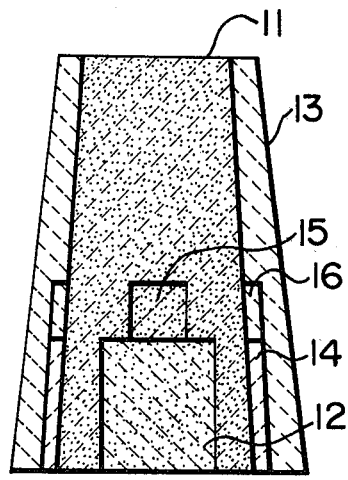
Figure 8:
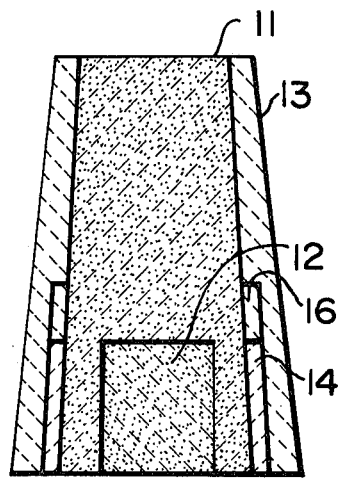
Figure 9:
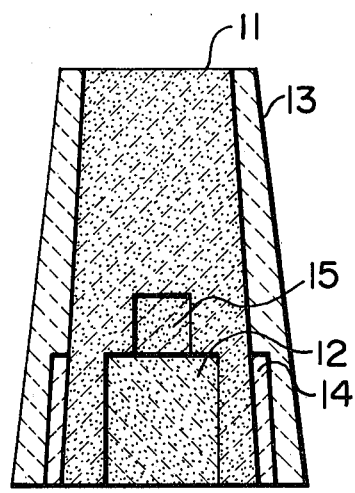

FIG. 7 is still another embodiment of porous plug embodying in combination of wear detection refractory elements of FIGS. 4 and 6. FIG. 8 is another embodiment wherein the wear detection elements of FIGS. 2 and 6 are combined in a single porous plug. FIG. 9 is yet another embodiment wherein the wear detection refractory elements of FIGS. 3 and 4 are combined.

In the examples of FIGS. 5–9, the non-porous refractory sleeves 14 and 16 may be substituted, as desired, for the entire radial thickness of the outer casing 13. That is, the outer casing 13 will in this alternative arrangement be axially juxtaposed above the non-porous refractory sleeve 14 in the case of FIGS. 5 and 9 or above the upper sleeve 16 in the case of FIGS. 6–8. Otherwise, the non-porous refractory sleeves 14 and 16 may be embedded in, or more accurately set-in, the outer casing 13 as shown. In the latter cases and as shown, the light radiating from the exposed top surface of the plug, when worn sufficiently, may have triple stripes when detecting the wear, so that discrimination is easy. Discrimination is further improved when the emissive powers of the non-porous refractory sleeves 14 and 16 are either greater or smaller than either of the emissive powers of the porous refractory body 11 and the outer casing 13.

According to the invention, as illustrated above, it is possible to effectively detect by observing the exposed and eroded top surface of each plug, the ending of the life for the plugs of FIGS. 2, 3 and 5, and the position of progressive wear and the ending of the life for the plugs of FIGS. 4, 6, 7, 8 and 9.

The porous and non-porous refractory materials making up the porous refractory body 11 and the wear detection refractory elements 12 and 14–16 may be based on oxides such as silica, alumina and magnesia or compositions thereof. The refractory materials may additionally contain a small amount of impurities such as oxides of iron which have a total emissive power of less than 0.6 at temperatures below 1900° K. Since the emissive power of the refractory material varies according to particle size, therefore, the emissive powers of the refractory materials can be adjusted by selecting different particle sizes, and if the refractory materials are mixed with transition element compounds, it is possible to increase the emissive power substantially even with a small amount of such a compound depending upon the type of compound, so that the total emissive power preferably can be adjusted by about 0.1. The transition element compound may for example be an oxide of chromium which does not lower the solidus curve temperature of silica, alumina or magnesia or the composite compound thereof, which are the major components of the refractory material, i.e., does not substantially deteriorate the refractoriness of the refractory material. Above all, chromium oxide III ($Cr_2O_3$) is most suitable. Mixing by 15% by quantity thereof or more does not affect the refractoriness but is desirable because it improves slag resistance. The following two examples involving use of porous plugs of the type shown in FIGS. 2 and 3 will further clarify the structure and functional effect of the invention.

(1)—MANUFACTURE OF THE POROUS PLUG

A porous plug was manufactured with the chemical composition shown in the following table wherein the numerical values are percent by quantity. With such chemical compositions, the porous refractory insert 12 has an emissive power greater than the emissive power of the porous refractory body 11 of FIG. 2 whereas the non-porous refractory sleeve 14 has an emissive power greater than the emissive power of the porous refractory body 11 and outer casing 14 of FIG. 3.

| Component | $Al_2O_3$ | $SiO_2$ | MgO | $Cr_2O_3$ |
|---|---|---|---|---|
| Refractory Body 11 | 95 | 4 | 0 | 1 |
| Refractory Casing 13 | 95 | 2 | 3 | 0 |
| Refractory Insert 12 and Sleeve 14 | 92 | 3 | 0 | 5 |

In the manufacturing process of the porous plug shown in FIG. 2, a plug was molded from the material of the refractory insert 12 contained in a polyethylene bag and placed at the bottom of a metal mold, and thereafter the molding was further formed by filling the metal mold with the material of the refractory body 11. Thereafter, the resultant molded plug was burned or scintered and finally provided in customary manner with a steel or iron jacket and a gas intake pipe. The outer shape of the refractory body was such that the upper diameter was about 100 mm., the lower diameter was about 200 mm., the height was about 250 mm. and the height of the refractory insert was about 100 mm.

In the manufacturing process of the porous plug shown in FIG. 3, the non-porous refractory sleeve 14 was premolded under half of the desired final pressure and inserted into the core of the metal mold. Thereafter, the metal mold was filled with the material of the outer casing 13 and the entire sleeve and casing was press molded. The thusly formed sleeve and casing was then adhered to a previously prepared porous refractory body 11 with a refractory mortar. Thereafter, the steel jacket and gas intake pipe was assembled on the adhered sleeve and casing assembly and the body. The outer shape of the thusly formed refractory body 11 was such that the upper diameter was about 80 mm., the lower diameter was about 115 mm. and the height was about 270 mm. The outer casing 13 was of such configuration that its inner surface contacted the outer surface of the refractory body 11 and its outer upper diameter was about 110 mm., its outer lower diameter was about 213 mm. and its height was about 270 mm. The non-porous refractory sleeve 14 was of such shape that its inner surface contacted the outer surface of the refractory body 11, and its inner lower diameter was about 115 mm., its outer upper diameter was about 132 mm., its outer lower diameter was about 145 mm. and its height was about 100 mm.

(2)—TEST FOR PRACTICAL USE

Two embodiments of porous plugs were fixed in a ladle for continuous casting, such ladle having a capacity of 250 tons, and ten tests were run for each plug. The lives of the plugs ranged from eight to fifteen uses and the average life was ten uses. In each case, it was possible to precisely detect the ending of the plug life. The test conditions were as follows:

(i) Use condition:
Temperature of the molten steel: 1880°–1900° K.
Argon blowing: 180 Nl/min., 5–10 min.

(ii) Observation:
The ladle, after the discharge of molten steel was turned down, the surface of the porous plug was cleaned by blowing oxygen, and thereafter the plug was observed with opera glasses of 3.5 magnification through a green filter used for gas welding. The temperature when observed was in the range of 1200° to 1350° K.

Although the invention has been shown and described with respect to preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A porous plug for treating molten metal comprising a body having an axis, said body being made of porous refractory material through which gas is blown for introduction into the molten metal, and wear detection refractory means in transaxial juxtaposition with said body over a portion of the axial height of said body, said wear detection refractory means having an emissive power different from that of said body for providing a discernible indication of the extent of wear of said body.

2. A plug as set forth in claim 1 wherein said wear detection refractory means includes an insert embodied within said body, said insert being made of porous refractory material and having an end face located at the minimum melt-down height of said body.

3. A plug as set forth in claim 1 wherein said wear detection refractory means includes a non-porous refractory sleeve about said body, said sleeve having an end face located at the minimum melt-down height of said body.

4. A plug as set forth in claim 1 wherein said wear detection refractory means includes at least two refractory elements having an emissive power different from that of said body, said elements having end faces located at different axial heights of said body.

5. A porous plug for treating molten metal comprising a body having an axis, said body being made of porous refractory material through which gas is blown for introduction into the molten metal, and a wear detection refractory element axially coextensive with said body over a portion of the axial height of said body, said element having an emissive power different from that of said body.

6. A plug as set forth in claim 5 wherein said refractory element has an end face located at the minimum melt-down height of said body.

7. A plug as set forth in claim 6 wherein said body has upper and lower axial end portions, and said element is axially coextensive with said lower axial end portion.

8. A plug as set forth in claim 5 including a second wear detection refractory element axially arranged with respect to said first mentioned refractory element and having an emissive power different from that of said body.

9. A plug as set forth in claim 8 wherein said second element has a transaxial cross-sectional shape different from that of said first mentioned element.

10. A plug as set forth in claim 2 wherein said element includes an insert embodied within said body, said insert having a transaxial cross-sectional area less than that of said body.

11. A plug as set forth in claim 10 wherein said insert has an end face located at the minimum melt-down height of said body.

12. A plug as set forth in claim 10 wherein said body has upper and lower spaced axial end portions, and said insert is axially coextensive with said lower axial end portion.

13. A plug as set forth in claim 12 wherein said body is in the form of a truncated cone, and said insert has an axial height of the greater of about 100 mm. or about one-half the greatest diameter of said body.

14. A plug as set forth in claim 10 wherein said insert is made of porous refractory material.

15. A plug as set forth in claim 2 wherein said element includes a sleeve about said body.

16. A plug as set forth in claim 15 wherein said sleeve has an end face located at the minimum melt-down height of said body.

17. A plug as set forth in claim 15 wherein said body has upper and lower spaced axial end portions, and said sleeve is axially coextensive with said lower axial end portion.

18. A plug as set forth in claim 15 including a non-porous refractory casing closing the side surface of said body.

19. A porous plug for treating molten metal, characterized in that said plug is made of a porous refractory through which gas is blown for introduction into the molten metal, and that a portion in the interior or the outer periphery of such porous refractory is provided with a refractory whose emissive power is different from the emissive power of said porous refractory.

20. A porous plug as set forth in claim 19 wherein a non-porous refractory is arranged enclosing the porous refractory.

21. A porous plug as set forth in claim 19 wherein the height of the refractory which is arranged at a portion of the interior or the outer periphery of the porous refractory, is of the greater value of any of 100 mm. from the bottom of said porous plug and the half of the diameter of the plug bottom surface.

* * * * *